United States Patent [19]

Castaigne

[11] 3,914,312

[45] Oct. 21, 1975

[54] PROCESS FOR THE PREPARATION OF PROPARGYLAMINE

[75] Inventor: Albert Rene Joseph Castaigne, Toulouse, France

[73] Assignee: Centre d'Etudes pour L'Industrie Pharmaceutique, Toulouse, France

[22] Filed: Jan. 18, 1974

[21] Appl. No.: 434,593

[30]     Foreign Application Priority Data

Feb. 7, 1973   France .............................. 73.04323

[52] U.S. Cl...... 260/583 H; 260/288 R; 260/268 H; 260/290 R; 260/296 R; 260/326 R
[51] Int. Cl.[2].................. C07C 87/06; C07C 87/24
[58] Field of Search ................................ 260/583 H

[56]          References Cited
           UNITED STATES PATENTS
2,827,488    3/1958    Fegley et al. .................... 260/583 H

*Primary Examiner*—Paul F. Shaver
*Attorney, Agent, or Firm*—Young & Thompson

[57]              ABSTRACT

The invention relates to a process for the preparation of propargylamine comprising reacting propargylphthalimide with a primary mono- or poly-amine selected from the aliphatic, cycloaliphatic, aromatic and heterocyclic mono- or poly-amines, the hydroxyamines and the amino-ethers having a boiling point above 130°C.

This process gives a highly pure product in high yields.

5 Claims, No Drawings

PROCESS FOR THE PREPARATION OF PROPARGYLAMINE

This invention relates to a new process for the preparation of propargylamine which is a known compound, already used in many technical fields.

Propargylamine and propargylphthalimide possess corrosion-inhibiting properties (Baba et al., Chem. Abstr., 57, 150h, 1962). In addition, propargylamine is used as intermediate derivative in the synthesis of a great number of derivatives used both in the chemical industry and in the pharmaceutical industry.

Moreover, U.S. Pat. No. 3,120,566 discloses that propargyl nitramine (prepared from propargylamine) is used as propellant in rocket fuels.

However, the cost of propargylamine is very high because it has never been found possible heretofore to develop a low-cost synthesis process providing high yields.

Propargylamine has already been prepared by reacting propargyl bromide with ammonia; this method, however, gives a mixture of mono-, di- and triamines (Chauvalier et al., Compt. Rend., 232, 167, 1951). Marszak et al. (Compt. Rend. 241, 704, 1955) operate in a different manner by treating the hexamethylene tetramine-propargylbenzene sulfonate complex with hydrochloric acid. This process has major drawbacks: on the one hand, the starting materials are expensive and, on the other hand, the yields obtained are very low. Indeed, this process gives propargylamine hydrochloride which is very difficult to convert to the free base because propargylamine is highly hygroscopic and forms very rapidly a hydrate.

The object of the present invention is to overcome the above-described drawbacks and to provide a process for preparing propargylamine readily and in high yields. Indeed, the yields obtained with the process of this invention are very high and vary within a range from 90 to 98%.

The process of this invention comprises reacting propargyl phthalimide with a primary mono- or poly-amine selected from the aliphatic, cycloaliphatic, aromatic and heterocyclic mono- and polyamines, the hydroxy-amines and the amino-ethers and having a boiling point in excess of 130°C.

This transamination reaction may be represented diagrammatically by the following reaction equation:

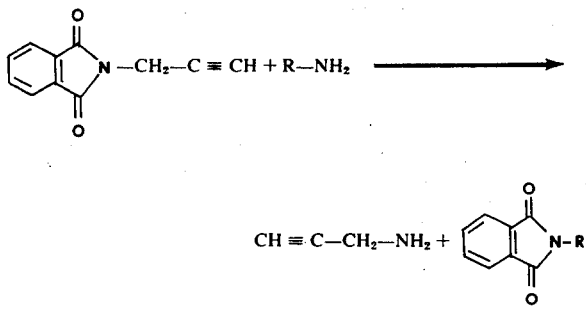

The propargylphthalimide used in this reaction is a well known derivative which has been described in particular by Sato, Nippon Kagaku Zasski 76, 1404 (1555), (Chem. Abstr., 51, 17760b, 1957).

The second reagent of the process of this invention is a primary amine which may be an aliphatic, aromatic, cycloaliphatic or heterocyclic mono- or poly-amine, the only proviso being that it does not bear any groups or substituents liable to interfere with the transamination reaction.

The best propargylamine yields are obtained by using a primary amine containing not more than 18 carbon atoms, and preferable not more than 12 carbon atoms and having a boiling point in excess of 130°C, preferably in excess of 170°C.

Primary amines useful in the process of this invention are, for example, high boiling aliphatic and cycloaliphatic amines such as heptylamine, nonylamine, undecylamine, cyclohexylamine, ethylcyclohexylamine and their homologs; high boiling aromatic amines such as aniline, para-methylaniline, 3,5-dimethylaniline, benzylamine, β-phenethylamine, naphthylamine and their homologs; heterocyclic amines such as aminopyridine, aminopicoline, aminoquinoline and their homologs; aliphatic amines such as diaminopropane, diaminobutane, 1-amino-2-diethylaminobutane and their homologs; polyamines such as diethylene-triamine and its analogs; hydroxy-amines such as ethanolamine, the amino-propanols, the aminobutanols and their homologs; amino-ethers such as ethoxybutylamine, ethoxyhexylamine and their homologs.

Among said primary amines, it is preferred to use diethylene triamine (b.p. 207°C), triethylene-tetramine (b.p. 227°C), diethylamino-propylamine (b.p. 169°C), dipropylenetriamine (b.p. 240°C), ethanolamine (b.p. 170°C), N-aminoethylethanolamine (b.p. 162°C), N-aminoethylpiperazine (b.p. 222°C) and benzylamine (b.p. 185°C).

It is preferred to react the propargylphthalimide with the primary amine in a reaction medium having a high boiling temperature, in excess of 140°C. This reaction medium may consist, for example, of an excess of the primary amine used in the reaction, or of a solvent such as diphenyl ether, methyl carbitol, ethyl carbitol, butyl carbitol, and the like.

The propargylphthalimide and the primary amine may be reacted either on stoichiometric amounts, or in the presence of an excess of the primary amine when the latter is used as reaction medium. It is advantageous to operate in the presence of excess primary amine, because propargylphthalimide is the more expensive starting material.

The transamination reaction may be catalyzed by the presence, in the reaction medium, of an inorganic acid salt of the reactive primary amine or of one of the other aforementioned primary amines. The amounts of said catalyst useful in the reaction vary within a range from 0.1 to 25 moles % with respect to propargylphthalimide. Said inorganic acid salts may be the hydrochlorides, the hydrobromides, the sulfates, and the like.

The resulting propargylamine is extracted from the reaction medium by any suitable conventional means, for example by distillation as it is formed. By this means, the reaction equilibrium is broken in the direction of propargylamine production.

The reaction is advantageously effected at temperatures from 140°C to 250°C and preferably from 170°C to 200°C. At such temperatures, the reaction takes 2–3 hours on the average.

The propargylamine obtained by distillation is absolutely pure and may be used as such for subsequent reactions.

The following non limiting examples are given to illustrate the invention.

EXAMPLE 1

In a 2 litre flask provided with a distillation column are added propargylphthalimide (740 g; 4 moles), dibutylcarbitol (1 litre) and diethylene triamine (515 g; 5 moles, i.e., a 25% excess). The suitably stirred mixture, whose temperature reaches spontaneously 50°–60°C, is then gradually heated up to 200°C; the propargylamine distils as it is formed; the major fraction (80%) is collected at a temperature of 83°–84°C. Yield: 94%.

EXAMPLE 2

According to the procedure of Example 1, propargylphthalimide (925 g; 5 moles) is reacted with diethylenetriamine (670 g; 6.5 moles, i.e. a 30% excess). The resulting yield is 92%.

EXAMPLE 3

Propargylphthalimide (740 g; 4 moles) and ethanolamine (305 g; 5 moles, i.e. a 25% excess) are reacted under the same conditions as in Example 1. The resulting yield is 95%.

EXAMPLE 4

Propargylphthalimide (740 g; 4 moles), dibutylcarbitol (1 litre) and benzylamine (642 g; 6 moles, i.e. a 50% excess) are reacted in the presence of benzylamine hydrochloride (28.4 g; 0.2 mole) catalyst. Yield: 93%.

Having now described my invention what I now claim as new and desire to secure by Letters Patent is:

1. Process for the preparation of propargylamine, comprising reacting propargylphthalimide with an amine selected from the group consisting of diethylene triamine, triethylene tetramine, diethylaminopropylamine, dipropylenetriamine, ethanolamine, N-aminoethylethanolamine, N-aminoethylpiperazine and benzylamine.

2. Process as claimed in claim 1, wherein the reaction is effected in a reaction medium having a boiling point above 140°C.

3. Process as claimed in claim 2, wherein the reaction medium comprises a solvent for the reagents selected from diphenyl ether, methyl carbitol, ethyl carbitol and butyl carbitol.

4. Process as claimed in claim 1, wherein the reaction is catalyzed by addition to the reaction medium of from about 0.1 to about 25 moles %, with respect to the propargylphthalimide, of an inorganic acid salt of said amine.

5. Process as claimed in claim 1, wherein the reaction is effected at a temperature from 140°C to 250°C.

* * * * *